United States Patent [19]

Arakawa et al.

[11] Patent Number: 4,863,826

[45] Date of Patent: Sep. 5, 1989

[54] RADIATION IMAGE STORAGE PANEL

[75] Inventors: Satoshi Arakawa; Masaharu Waki; Nobufumi Mori, all of Minami-ashigara-shi, Japan

[73] Assignee: Fuji Photo Film Co., Ltd., Kanagawa, Japan

[21] Appl. No.: 916,649

[22] Filed: Oct. 8, 1986

[30] Foreign Application Priority Data

Oct. 8, 1985 [JP] Japan ................................ 60-225614

[51] Int. Cl.4 .......................... G03C 1/72; C09K 11/02

[52] U.S. Cl. .................................... 430/138; 430/139; 252/301.36; 250/484.1

[58] Field of Search ............................... 430/139, 138; 258/404.1; 252/301.6 P, 301.35, 301.36

[56] References Cited

U.S. PATENT DOCUMENTS 4,199,617 4/1980 Vanderpool ................... 252/301.36
4,452,861 6/1984 Okamoto et al. ................ 428/907.7
4,547,672 10/1985 Arakawa et al. ................ 250/483.1

FOREIGN PATENT DOCUMENTS 0177090 9/1985 Japan ............................. 252/301.36

*Primary Examiner*—Roland E. Martin
*Assistant Examiner*—Lee C. Wright
*Attorney, Agent, or Firm*—Gerald J. Ferguson, Jr.

[57] ABSTRACT

A radiation image storage panel comprising a support and a phosphor layer provided on the support which comprises a binder and stimulable phosphor particles dispersed therein, characterized in that said stimulable phosphor particles are covered with a polymer material.

5 Claims, 1 Drawing Sheet

RADIATION IMAGE STORAGE PANEL

BACKGROUND OF THE INVENTION

1. Field of the Invention

The present invention relates to a radiation image storage panel employable for a radiation image recording and reproducing method utilizing a stimulable phosphor.

2. Description of the Prior Art

For obtaining a radiation image, there has been conventionally employed a radiography utilizing a combination of a radiographic film having an emulsion layer containing a photosensitive silver salt material and an intensifying screen. As a method replacing the conventional radiography, a radiation image recording and reproducing method utilizing a stimulable phosphor as described, for example, in U.S. Pat. No. 4,239,968, has been recently paid much attention. In the radiation image recording and reproducing method, a radiation image storage panel comprising a stimulable phosphor (i.e., a stimulable phosphor sheet) is used, and the method involves steps of causing the stimulable phosphor of the panel to absorb a radiation energy having passed through an object or having radiated from an object; sequentially exciting the stimulable phosphor with an electromagnetic wave such as visible light and infrared rays (hereinafter referred to as "stimulating rays") to release the radiation energy stored in the phosphor as light emission (stimulated emission); photoelectrically detecting the emitted light to obtain electric signals; and reproducing the radiation image of the object as visible image from the electric signals.

In the radiation image recording and reproducing method, a radiation image is obtainable with a sufficient amount of information by applying a radiation to an object at considerably smaller dose, as compared with the conventional radiography. Accordingly, this method is of great value especially when the method is used for medical diagnosis.

The radiation image storage panel employed in the radiation image recording and reproducing method has a basic structure comprising a support and a phosphor layer provided on one surface of the support. Further, a transparent film of a polymer material is generally provided on the free surface (surface not facing the support) of the phosphor layer to keep the phosphor layer from chemical deterioration or physical shock.

The phosphor layer comprises a binder and a stimulable phosphor dispersed therein. The stimulable phosphor emits light (gives stimulated emission) when excited with an electromagnetic wave such as visible light or infrared rays (stimulating rays) after having been exposed to a radiation such as X-rays. Accordingly, the radiation having passed through an object or having radiated from an object is absorbed by the phosphor layer of the radiation image storage panel in proportion to the applied radiation dose, and a radiation image of the object is produced in the panel in the form of a radiation energystored image. The radiation energy-stored image can be released as stimulated emission by sequentially irradiating the panel with stimulating rays. The stimulated emission is then photoelectrically converted to electric signals, so as to reproduce a visible image from the electric signals.

The radiation image recording and reproducing method is a very advantageous method for obtaining a visible image as described above, and a radiation image storage panel employable in the method is desired to have high sensitivity and provide an image of high quality (high sharpness, high graininess, etc.) as well as a radiographic intensifying screen employed in the conventional radiography. Particularly when the method is applied to medical radiography, the sensitivity of the radiation image storage panel is desired to have higher level even if the level-up is little, from the viewpoint of lowering the radiation dose applied to a human body.

Further, in the case that the stimulable phosphor contained in the phosphor layer is liable to be deteriorated through the environmental atmosphere, for instance, that the phosphor is decreased in the emission luminance by absorption of water (namely, the phosphor lacks water vapro resistance), it is desired to prevent the stimulable phosphor from the deterioration (and to prevent the panel from decrease of sensitivity) by making the phosphor particles water vapor-resistant.

SUMMARY OF THE INVENTION

It is an object of the present invention to provide a radiation image storage panel improved in the sensitivity.

It is another object of the invention to provide a radiation image storage panel in which stimulable phosphor particles contained in a phosphor layer are improved in the moisture resistance.

The objects are accomplished by a radiation image storage panel comprising a support and a phosphor layer provided on the support which comprises a binder and stimulable phosphor particles dispersed therein, characterized in that said stimulable phosphor particles are covered with a polymer material.

According to the present invention, the stimulable phosphor particles contained in the phosphor layer are covered with a polymer material, so that the radiation image storage panel is prominently enhanced in the sensitivity. Particularly, the phosphor particles are subjected to encapsulation to produce micro-capsules, so as to improve the moisture resistance thereof.

In conventional, a phosphor layer is prepared by directly coating a binder solution dispersing stimulable phosphor particles (i.e. a coating dispersion) onto a support. Air is introduced into the coating dispersion together with the phosphor particles to produce air bubbles around the phosphor particles in the resulting phosphor layer, and therefore the difference of refractive index between the phosphor particles and the air bubbles induces scattering of incident stimulating rays to decrease the sensitivity of the radiation image storage panel. According to the present invention, the phosphor particles are beforehand covered with a polymer material, so that the difference of refractive index therebetween is reduced to prevent the stimulating rays from scattering in the phosphor layer. As a result, the radiation image storage panel of the invention is enhanced in the sensitivity.

Even when the stimulable phosphor to be used is hygroscopic and apt to be deteriorated by water (moisture) absorption, particles of the stimulable phosphor have high resistance to moisture in the phosphor layer because the phosphor particles are covered with a polymer material in the present invention. Particularly when the phosphor particles are in the form of a micro-capsule comprising the phosphor particle of a core material and the polymer material of a shell, the phosphor particles are prominently improved in the moisture resistance. Therefore, the hygroscopic phosphor particles are prevented from the deterioration and the radiation image storage panel containing them can be prevented from the decrease of sensitivity with a lapse of time.

Further, the polymer material employed for covering the phosphor particles may contain various additives which are to be dispersed in the phosphor layer, so that the dispersibility of the additives in the phosphor layer is enhanced. For instance, when a colorant such as dye or pigment is incorporated into the polymer material, it does not occur that the colorant moves up to agglomerate on the surface of the phosphor layer, which phenomenon is likely to take place in the conventional way of directly incorporating the colorant into the binder solution. The colorant is so homogeneously dispersed in the phosphor layer that the scattered stimulating rays can be efficiently absorbed by the colarant. As a result, the sharpness of the resulting image can be effectively enhanced by using a smaller amount of colorant than that used in the conventional panel.

DETAILED DESCRIPTION OF THE INVENTION

Figure 1:
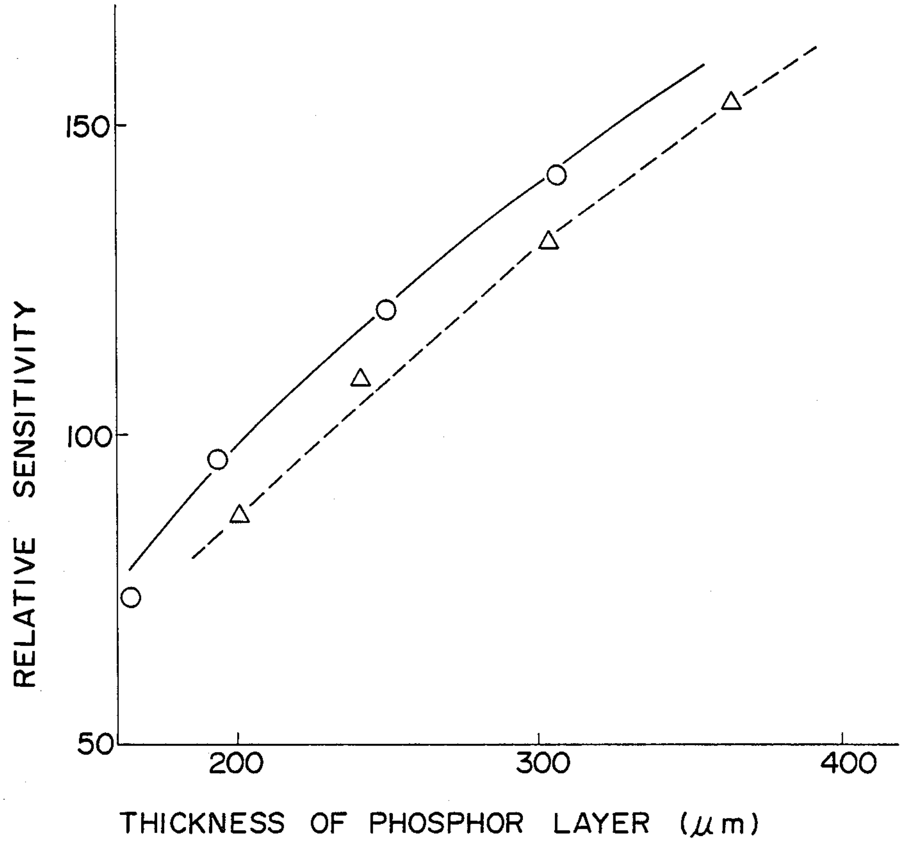
FIG. 1 is a graph showing a relationship between the thickness of a phosphor layer and the sensitivity of a radiation image storage panel, wherein a solid curve and a dotted curve respectively indicate the radiation image storage panel of the present invention and the known radiation image storage panel.

The radiation image storage panel of the present invention having the above-described advantages can be prepared, for instance, in the following manner.

The support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonatee; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitivity type radiation image storage panel.

In the preparation of a known radiation image storage panel, one or more additional layers are occasionally provided between the support and a phosphor layer, so as to enhance the bonding between the support and the phosphor layer, or to improve the sensitivity of the panel or the quality of an image (sharpness and graininess) provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided on the support.

As described in U.S. patent application No. 496,278, the phosphor layer-side surface of the support (or the surface of an adhesive layer, light-reflecting layer, or light-absorbing layer in the case where such layers provided on the support) may be provided with protruded and depressed portions for enhancement of the sharpness of the image.

On the support is formed a phosphor layer.

The phosphor layer basically comprises a binder and stimulable phosphor particles dispersed therein. The phosphor particle which is a characteristic requisite of the invention is a particle covered with a polymer material.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 300–500 nm when excited with stimulating rays in the wavelength region of 400–900 nm.

Examples of the stimulable phosphor employable in the radiation image storage panel of the invention include:

SrS:Ce, Sm, SrS:Eu,Sm, $ThO_2$:Er, and $La_2O_2S$:Eu, Sm, as described in U.S. Pat. No. 3,859,527;

ZnS:Cu, Pb, BaO•$xAl_2O_3$:Eu, in which x is a number satisfying the condition of $0.8 \leqq x \leqq 10$, and $M^{II}$O•$SiO_2$:A, in which $M^{II}$ is at least one divalent metal selected from the group consisting of Mg, Ca, Sr, Zn, Cd and Ba, A is a least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,236,078;

$(Ba_{1-x-y}, Mg_x, Ca_y)FX:aEu^{2+}$, in which X is at least one element selected from the group consisting of Cl and Br, x and y are numbers satisfying the conditions of $0 < x+y \leqq 0.6$ and $xy \neq 0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in U.S. Pat. No. 4,236,078;

$(Ba_{1-x}, M^{2+}{}_x)FX:yA$, in which $M^{2+}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in U.S. Pat. No. 4,239,968;

$M^{II}$FX•xA:yLn, in which $M^{II}$ is at least one element selected from the group consisting of Ba, Ca, Sr, Mg, Zn and Cd; A is at least one compound selected from the group consisting of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, Tahd $2O_5$ and $ThO_2$; Ln is at least one element selected from the group consisting of Eu, Tb, Ce, Tm, Dy, Pr, Ho, Nd, Yb, Er, Sm and Gd; X is at least one element selected from the group consisting of Cl, Br and I; and x and y are numbers satisfying the conditions of $5\times10^{-5}\leqq x\leqq0.5$ and $0<y\leqq0.2$, respectively, as described in Japanese Patent Provisional Publication No. 55(1980)-160078;

$(Ba_{1-x}, M^{II}_x)F_2\bullet aBaX_2$:yEEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of Zr and Sc; and a, x, y and z are numbers satisfying the conditions of $0.5\leqq a\leqq1.25$, $0\leqq x\leqq1$, $10^{-6}\leqq y\leqq2\times10^{-1}$, and $0<z\leqq10^{-2}$, respectively, as described in Japanese Patent Provisional Publication No. 56(1981)-116777;

$(Ba_{1-x}, M^{II}_x)F_2\bullet aBaX_2$:yEu,zB, in which $M^{II}$ is at least one element selected from the group consisting of Be, Mg, Ca, Sr, Zn and Cd; X is at least one element selected from the group consisting of Cl, Br and I; and a, x, y and z are numbers satisfying the conditions of $0.5\leqq a\leqq1.25$, $0\leqq x\leqq1$, $10^{-6}\leqq y\leqq2\times10^{-1}$, and $0<z\leqq2\times10^{-1}$, respectively, as described in Japanese Patent Provisional Publication No. 57 (1982)-23673;

$(Ba_{1-x}, M^{II}_x)F_2\bullet aBaX_2$:yEu,zA, in which $M^{II}$ is at least one element selected from the group consisting of Be, Mg, Ca, Sr, Zn and Cd; X is at least one element selected from the group consisting of Cl, Br and I; A is at least one element selected from the group consisting of As and Si; and a, x, y and z are numbers satisfying the conditions of $0.5\leqq a\leqq1.25$, $0\leqq x\leqq1$, $10^{-6}\leqq y\leqq2\times10^{-1}$, and $0<z\leqq5\times10^{-1}$, respectively, as described in Japanese Patent Provisional Publication No. 57 (1982)-23675;

$M^{III}OX$:xCe, in which $M^{III}$ is at least one trivalent metal selected from the group consisting of Pr, Nd, Pm, Sm, Eu, Tb, Dy, Ho, Er, Tm, Yb, and Bi; X is at least one element selected from the group consisting of Cl and Br; and x is a number satisfying the condition of $0<x<0.1$, as described in Japanese Patent Provisional Publication No. 58 (1983)-69281;

$Ba_{1-x}M_{x/2}L_{x/2}FX:yEu^{2+}$, in which M is at least one alkali metal selected from the group consisting of Li, Na, K, Rb and Cs; L is at least one trivalent metal selected from the group consisting of Sc, Y, La, Ce, Pr, Nd, Pm, Sm, Gd, Tb, Dy, Ho, Er, Tm, Yb, Lu, Al, Ga, In and Tl; X is at least one halogen selected from the group consisting of Cl, Br and I; and x and y are numbers satisfying the conditions of $10^{-2}\leqq x\leqq0.5$ and $0<y\leqq0.1$, respectively, as described in U.S. patent application No. 497,805;

BaFx.xA:$yEu^{2+}$, in which X is at least one halogen selected from the group consisting of Cl, Br and I; A is at least one fired product of a tetrafluoroboric acid compound; and x and y are numbers satisfying the conditions of $10^{-6}\leqq x\leqq0.1$ and $0<y\leqq0.1$, respectively, as described in U.S. patent application No. 520,215;

BaFx.xA:$yEu^{2+}$, in which X is at least one halogen selected from the group consisting of Cl, Br and I; A is at least one fired product of a hexafluoro compound selected from the group consisting of monovalent and divalent metal salts of hexafluoro silicic acid, hexafluoro titanic acid and hexafluoro zirconic acid; and x and y are numbers satisfying the conditions of $10^{-6}\leqq x\leqq0.1$ and $0<y\leqq0.1$, respectively, as described in U.S. patent application No. 502,648;

BaFX•xNaX':$aEu^{2+}$, in which each of X and X' is at least one halogen selected from the group consisting of Cl, Br and I; and x and a are numbers satisfying the conditions of 0<x23 2 and $0<a\leqq0.2$, respectively, as described in Japanese Patent Provisional Publication No. 59(1984)-56479;

$M^{II}FX\bullet xNaX'$:$yEu^{2+}$:zA, in which $M^{II}$ is at least one alkaline earth metal selected from the group consisting of Ba, Sr and Ca; each of X and X' is at least one halogen selected from the group consisting of Cl, Br and I; A is at least one transition metal selected from the group consisting of V, Cr, Mn, Fe, Co and Ni; and x, y and z are numbers satisfying the conditions of $0<x\leqq2$, $0<y\leqq0.2$ and $0<z\leqq10^{-2}$, respectively, as described in U.S. patent application No. 535,928;

$M^{II}FX\bullet aM^{I}X'\bullet bM'^{II}X''_2\bullet cM^{III}X'''_3\bullet xA:yEu^{2+}$, in which $M^{II}$ is at least one alkaline earth metal selected from the group consisting of Ba, Sr and Ca; $M^{I}$ is at least one alkali metal selected from the group consisting of Li, Na, K, Rb and Cs; $M'^{II}$ is at least one divalent metal selected from the group consisting of Be and Mg; $M^{III}$ is at least one trivalent metal selected from the group consisting of Al, Ga, In and Tl; A is metal oxide; X is at least one halogen selected from the group consisting of Cl, Br and I; each of X', X'' and X''' is at least one halogen selected from the group consisting of F, Cl, Br and I; a, b and c are numbers satisfying the conditions of $0\leqq a\leqq2$, $0\leqq b\leqq10^{-2}$, $0\leqq c\leqq10^{-2}$ and $a+b+c>10^{-6}$; and x and y are numbers satisfying the conditions of $0<x\leqq0.5$ and $0<y\leqq0.2$, respectively, as described in U.S. patent application No. 543,326;

$M^{II}X_2\bullet aM^{II}X'_2:xEu^{2+}$, in which $M^{II}$ is at least one alkaline earth metal selected from the group consisting of Ba, Sr and Ca; each of X and X' is at least one halogen selected from the group consisting of Cl, B and I, and $X\neq X'$; and a and x are numbers satisfying the conditions of $0.1\leqq a\leqq10.0$ and $0<x\leqq0.2$, respectively, as described in U.S. patent application No. 660,987;

$M^{II}FX\bullet aM^{I}X':xEu^{2+}$, in which $M^{II}$ is at least one alkaline earth metal selected from the group consisting of Ba, Sr and Ca; $M^{I}$ is at least one alkali metal selected from the group consisting of Rb and Cs; X is at least one halogen selected from the group consisting of Cl, Br and I; X' is at least one halogen selected from the group consisting of F, Cl, Br and I; and a and x are numbers satisfying the conditions of $0\leqq a\leqq4.0$ and $0<x\leqq0.2$, respectively, as described in U.S. patent application No. 668,464; and $M^{I}X$:xBi, in which $M^{I}$ is at least one alkali metal selected from the group consisting of Rb and Cs; X is at least one halogen selected from the group consisting of Cl, Br and I; and x is a number satisfying the condition of $0<x\leqq0.2$, as described in Japanese Patent Application No. 60(1985)-70484.

The $M^{II}X_2\bullet aM^{II}X'_2:xEu^{2+}$ phosphor described in the above-mentioned U.S. patent application No. 660,987 may contain the following additives in the following amount per 1 mol of $M^{II}X_2.aM^{II}X'_2$:

$bM^{I}X''$, in which $M^{I}$ is at least one alkali metal selected from the group consisting of Rb and Cs; X'' is at least one halogen selected from the group consisting of F, Cl, Br and I; and b is a number satisfying the condition of $0<b\leqq10.0$, as described in U.S. patent application No. 699,325;

$bKX''\bullet cMgX'''_2\bullet dM^{III}X''''_3$, in which $M^{III}$ is at least one trivalent metal selected from the group consisting of Sc, Y, La, Gd and Lu; each of X'', X''' and X'''' is at least one halogen selected from the group consisting of F, Cl, Br and I; and b, c and d are numbers satisfying the conditions of 0b≦2.0, $0\leqq c\leqq2.0$, $0\leqq d\leqq2.0$ and $2\times10^{-5}\leqq b+c+d$, as described in U.S. patent application No. 723,819;

yB, in which y is a number satisfying the condition of $2\times10^{-4}\leqq y\leqq 2\times10^{-1}$, as described in U.S. patent application No. 727,974;

bA, in which A is at least one oxide selected from the group consisting of $SiO_2$ and $P_2O_5$; and b is a number satisfying the condition of $10^{-4}\leqq b\leqq 2\times10^{-1}$, as described in U.S. patent application No. 727,972;

bSiO, in which b is a number satisfying the condition of $0<b\leqq 3\times10^{-2}$, as described in U.S. patent application No. 797,971;

$bSnX''_2$, in which X'' is at least one halogen selected from the group consisting of F, Cl, Br and I; and b is a number satisfying the condition of $0<b\leqq 10^{-3}$, as described in U.S. patent application No. 797,971;

$bCsX''\bullet cSnX'''_2$, in which each of X'' and X''' is at least one halogen selected from the group consisting of F, Cl, Br and I; and b and c are numbers satisfying the conditions of $0<b\leqq 10.0$ and $10^{-6}\leqq c\leqq 2\times10^{-2}$, respectively, as described in Japanese Patent Application No. 60(1985)-78033; and $bCsX''\bullet yLn^{3+}$, in which X'' is at least one halogen selected from the group consisting of F, Cl, Br and I; Ln is at least one rare earth element selected from the group consisting of Sc, Y, Ce, Pr, Nd, Sm, Gd, Tb, Dy, Ho, Er, Tm, Yb and Lu; and b and y are numbers satisfying the conditions of $0<b\leqq 10.0$ and $10^{-6}\leqq y\leqq 1.8\times10^{-1}$, respectively, as described in Japanese Patent Application No. 60(1985)-78035.

Among the above-described stimulable phosphors, the divalent europium activated alkaline earth metal halide phosphor and rare earth element activated rare earth oxyhalide phosphor are particularly preferred, because these phosphors show stimulated emission of high luminance. The above-described stimulable phosphors are given by no means to restrict the stimulable phosphor employable in the present invention. Any other phosphors can be also employed, provided that the phosphor gives stimulated emission when excited with stimulating rays after exposure to a radiation.

The polymer material employable for covering the phosphor particles preferably is a material having transmissivity to the light emitted by the phosphor particles as high as possible and hardly dissolved in a solvent employed in the coating dispersion for the preparation of a phosphor layer. Accordingly, the employable polymer material depends on the kind of the solvent for the coating dispersion. Examples of the polymer material include: natural polymers such as proteins (e.g. gelatin), polysaccharides (e.g. dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, polyester, polystyrene, styrene-maleic acid copolymer, polyamide, acrylonitrile-styrene copolymer, epoxy resin, polyvinyl formal, polyvinyl chloride, vinylidene chloride-acrylonitrile coplymer, polyethylene and cellulose acetate. Particularly preferred are polyester, nitrocellulose and polyalkyl (meth) acrylate.

The phosphor particles can be covered with the above-mentioned polymer material by conventional methods used for covering a solid powder such as a method which comprises dispersing the phosphor particles in a solution of the polymer material and subjecting the dispersion to spray drying. Particularly preferred method is encapsulating the phosphor particles with the polymer material to produce a micro-capsule comprising the phosphor particle as a core material and the polymer material as a shell.

For instance, in the method of phase-separation from an organic solution (namely, coacervation method) for encapsulating particles, the phosphor particles are homogeneously dispersed in a solution of the polymer material to give a suspension, and to the suspension is added a non-solvent to give a slurry precipitated with the encapsulated phosphor particles. The slurry is filtrated, washed and then dried to prepare micro-capsules comprising the phosphor particle as a core material and the polymer material as a shell.

Examples of the solvent employable for preparing a solution of the polymer material include lower alcohols such as methanol and ethanol; chlorinated hydrocarbons such as ethylene chloride; aromatic hydrocarbons such as benzene and toluene; and ethers such as dioxane. Examples of the non-solvent employable for forming microcapsules include lower alcohols such as methanol and propanol; ethers such as petroleum ether; and aliphatic hydrocarbons such as n-hexane. Both of the solvent and the non-solvent are suitably selected depending on the employed polymer material.

The method of encapsulating the phosphor particles to produce micro-capsules is restricted to the above-described coacervation method, and other methods such as in situ polymerization method, orifice method and spray drying method can be also employed in the invention.

The phosphor particles employable in the invention generally have a mean diameter ranging from 0.5 to 30 μm. The phosphor particles are preferably covered with the polymer material in the amount of 0.1-20% by weight of the phosphor particles. When the phosphor particles are encapsulated with the polymer material to produce microcapsules, the shell of the micro-capsule preferably has thickness ranging from 0.01 to 5 μm.

The polymer material may contain a variety of additives such as a colorant which absorbs a portion of stimulating rays for causing the phosphor to give stimulated emission and an antistatic agent. Examples of the colorant include an organic dye and a pigment such as ultramarine blue as described in Japanese Patent Provisional Publications No. 55 (1980)-163500 and No. 57(1982)-96300. Examples of the antistatic agent include metal oxides such as ZnO, $In_2O_3$, $SnO_2$ and ITO (a mixed crystal of $In_2O_3$ and $SnO_2$).

When the phosphor particles are covered with the polymer material containing the above-mentioned additives, these additives can make effects significantly because they are homogeneously dispersed in the phosphor layer. In other words, a small amount of the additives can effectively enhance the sharpness of the resulting image owing to coloring the phosphor layer, or improve the antistatic properties of the resulting panel.

The phosphor layer can be formed on the support, for instance, in the following manner using the phosphor particles covered with the polymer material.

Examples of the binder to be contained in the phosphor layer include: natural polymers such as proteins (e.g. gelatin),polysaccharides (e.g. dextran) and gum arabic; and synthetic polymers such as polyvinyl butyral, polyvinyl acetate, nitrocellulose, ethyl cellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate. These binders may be crosslinked with a crosslinking agent.

In the first place, the stimulable phosphor particles covered with the above-described polymer material and the binder are added to an appropriate solvent, and then they are mixed to prepare a coating dispersion comprising the phosphor particles homogeneously dispersed in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds. However, the solvent to be employed in the invention should be selected from those which hardly dissolve the polymer material covering the phosphor particles.

The ratio between the binder and the stimulable phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to improve the dispersibility of the phosphor particles therein, and may contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly onto the surface of the support to form a layer of the coating dispersion. The coating procedure can be carried out by a conventional method such as a method using a doctor blade, a roll coater or a knife coater.

After applying the coating dispersion onto the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 μm to 1 mm, and preferably from 50 to 500 μm.

The phosphor layer can be provided onto the support by the methods other than that given in the above. For instance, the phosphor layer is initially prepared on a sheet (false support) such as a glass plate, metal plate or plastic sheet using the aforementioned coating dispersion and then thus prepared phosphor layer is superposed on the genuine support by pressing or using an adhesive agent.

In the conventional radiation image storage panel, a transparent film is generally provided on the surface of the phosphor layer not facing the support to protect the phosphor layer from physical and chemical deterioration. The transparent protective film is preferably provided in the radiation image storage panel of the present invention.

The transparent film can be provided onto the phosphor layer by coating the surface of the phosphor layer with a solution of a transparent polymr such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 μm.

The radiation image storage panel of the invention may be colored with a colorant to enhance the sharpness of the resulting image as described in U.S. Pat. No. 4,394,581 and U.S. patent application No. 326,642. For the same purpose, the phosphor layer of the radiation image storage panel may contain a white powder as described in U.S. Pat. No. 4,350,893.

The present invention will be illustrated by the following examples, but these examples by no means restrict the invention.

EXAMPLE 1

To 100 parts of a dioxane solution containing 1 % wt of methyl ethyl ketone-insoluble polyester (trade name: Vylon 30P, available from Toyobo Co., Ltd., Japan) was added 20 parts of divalent europium activated barium fluorobromide stimulable phosphor particles ($BaFBr:0.001Eu^{2+}$, average diameter: 6 μm), and they were mixed to prepare a dispersion. Methanol was poured into the dispersion under stirring little by little to encapsulate the phosphor particles. From the dispersion containing micro-capsules was removed a supernatant liquid through decantation to give a slurry. The slurry was then stirred and washed with methanol at several times, and dried to obtain micro-capsules comprising the phosphor particle as a core material encapsulated with the polyester as a shell.

Subsequently, the phosphor particles in the form of micro-capsule are added to a methyl ethyl ketone solution containing polyester (trade name: Vylon 300, available from Toyobo Co., Ltd., Japan) and nitrocellulose (trade name: RS-120, available from Disel Chemical Industry Co., Ltd., Japan) to prepare a dispersion containing the phosphor particles. The binder ratio between the polyester and the nitrocellulose was 9:1 by weight. To the dispersion was added tricresyl phosphate to prepare a mixture, and the mixture was sufficiently stirred by means of a propeller agitator to obtain a coating dispersion homogeneously containing the micro-capsules of the phosphor particles and having a mixing ratio of 1:20 (binder : phosphor, by weight) and a viscosity of 25–35 PS (at 25° C.).

The coating dispersion was applied to a polyethylene terephthalate sheet containing titanium dioxide (support, thickness: 250 μm) placed horizontally on a glass plate The application of the coating dispersion was done using a doctor blade. The support having a layer of the coating dispersion was then placed in an oven and heated at a temperature gradually rising from 25° to 100° C. Thus, a phosphor layer having thickness of 250 μm was formed on the support.

On the phosphor layer was placed a polyethylene terephthalate transparent film (thickness: 12 μm; provided with a polyester adhesiver layer on one surface) to bond the film and the phosphor layer with the adhesive layer, to form a transparent protective film thereon. Thus, a radiation image storage panel consisting essentially of a support, a phosphor layer and a transparent protective film was obtained.

Further, a variety of radiation image storage panels having different thickness of the phosphor layer were obtained in the same manner as described above except for varying the thickness of the phosphor layer in the range of from 150 to 400 μm.

COMPARISON EXAMPLE 1

The procedure of Example 1 was repeated except for directly using the phosphor particles without subjecting the phosphor particles to encapsulation, to obtain a variety of radiation image storage panels consisting essentially of a support, a phosphor layer and a transparent protective film, and having different thickness of the phosphor layer.

The radiation image storage panels were evaluated on the sensitivity according to the following test.

The radiation image storage panel was excited with a He-Ne laser beam (wavelength: 632.8 nm) after having been exposed to a radiation at 80 KVp, to measure a relative sensitivity (amount of stimulable emission) thereof.

The results are shown in FIG. 1.

FIG. 1 graphically illustrates a relationship between the thickness of the phosphor layer plotted on the abscissa and the relative sensitivity plotted on the ordinate. In FIG. 1, a solid curve indicates the radiation image storage panels of Example 1 and a dotted curve indicates those of Comparison Example 1.

As is evident from the results shown in FIG. 1, the radiation image storage panels according to the present invention containing the micro-capsules of phosphor particles (Example 1) were prominently enhanced in the sensitivity as compared with the known radiation image storage panels containing the phosphor particles which were not encapsulated (Comparison Example 1).

We claim:

1. A radiation storage panel comprising a support, a phosphor layer provided on the support and a transparent protective film placed on the phosphor layer, said phosphor layer comprising one weight part of a binder and 8 to 100 weight parts of stimulable phosphor particles dispersed in the binder, wherein said stimulable phosphor particles are in the form of a micro-capsule comprising a phosphor particle as a core material and a polymer material as a shell, said polymer material being selected from the group consisting of polyester, nitrocellulose and polyalkyl acrylate.

2. A radiation image storage panel as claimed in claim 1, wherein said phosphor layer comprises one weight part of the binder and 8 to 40 weight parts of the stimulable phosphor particles.

3. A radiation image storage panel as claimed in claim 1 wherein said shell of the micro-capsule has thickness in the range of 0.01 to 5 μm.

4. The radiation image storage panel as claimed in claim 1, in which said stimulable phosphor particles are covered with the polymer material in the amount ranging from 0.1 to 20% by weight of said stimulable phosphor particles.

5. The radiation image storage panel as claimed in claim 1, wherein the shell contains an additive selected from the group consisting of a colorant and an antistatic agent.

* * * * *